United States Patent
Ohno et al.

(10) Patent No.: US 7,327,656 B2
(45) Date of Patent: Feb. 5, 2008

(54) TILT CORRECTION METHOD DETECTING TILT WITH SAME LINEAR VELOCITY AS UPON ACTUALLY RECORDING/REPRODUCING AT EACH RADIAL POSITION

(75) Inventors: Takehide Ohno, Kanagawa (JP); Masaki Ninomiya, Kanagawa (JP)

(73) Assignee: Ricoh Company, Ltd. (JP)

( * ) Notice: Subject to any disclaimer, the term of this patent is extended or adjusted under 35 U.S.C. 154(b) by 493 days.

(21) Appl. No.: 10/639,495

(22) Filed: Aug. 13, 2003

(65) Prior Publication Data

US 2004/0085868 A1 May 6, 2004

(30) Foreign Application Priority Data

Aug. 20, 2002 (JP) .............................. 2002-239008
May 9, 2003 (JP) .............................. 2003-131496

(51) Int. Cl.
*G11B 7/00* (2006.01)
(52) U.S. Cl. ............................... 369/53.19; 369/44.32
(58) Field of Classification Search ............... None
See application file for complete search history.

(56) References Cited

U.S. PATENT DOCUMENTS

| | | | |
|---|---|---|---|
| 5,128,806 A | 7/1992 | Ohno | |
| 5,140,572 A | 8/1992 | Kibune et al. | |
| 5,303,089 A | 4/1994 | Ohno | |
| 5,351,221 A | 9/1994 | Ohno | |
| 5,777,960 A | 7/1998 | Ohno | |
| 5,828,634 A | 10/1998 | Ohno | |
| 5,983,167 A | 11/1999 | Ebisawa | |
| 6,137,754 A * | 10/2000 | Furukawa et al. | 369/44.32 |
| 6,160,772 A * | 12/2000 | Muramatsu | 369/44.32 |
| 6,434,096 B1 | 8/2002 | Akagi et al. | |
| 6,459,664 B1 * | 10/2002 | Yamada et al. | 369/44.32 |
| 6,532,118 B2 | 3/2003 | Ohno et al. | |
| 6,542,449 B2 * | 4/2003 | Nakatsuka et al. | 369/53.1 |
| 6,587,416 B1 * | 7/2003 | Tsukihashi | 369/59.14 |
| 2002/0034151 A1 * | 3/2002 | Nakajima | 369/190 |
| 2003/0112726 A1 | 6/2003 | Ohno | |
| 2003/0123161 A1 | 7/2003 | Ohno | |
| 2003/0147314 A1 * | 8/2003 | Kondo et al. | 369/44.32 |

FOREIGN PATENT DOCUMENTS

| | | |
|---|---|---|
| EP | 1043717 A2 | 10/2000 |
| JP | 10-320838 | 12/1998 |
| JP | 3114661 | 9/2000 |
| JP | 2000-293875 | 10/2000 |
| JP | 2000-339727 | 12/2000 |
| JP | 2001-195763 | 7/2001 |
| JP | 2001-229559 | 8/2001 |

* cited by examiner

*Primary Examiner*—William Korzuch
*Assistant Examiner*—Tawfik Goma
(74) *Attorney, Agent, or Firm*—Dickstein Shapiro LLP

(57) ABSTRACT

Prior to recording/reproducing information to/from an optical disk rotationally driven by a spindle motor, an optical pickup is moved to a plurality of measuring positions set beforehand in a radial direction of the optical disk. A relative tilt between the optical disk and the optical pickup is detected with the spindle motor being rotated so that a linear velocity at each of the measuring positions equals a linear velocity upon actually recording or reproducing the information thereat. The tilt detected at each of the measuring positions is stored as tilt detection data corresponding to each of the measuring positions.

6 Claims, 15 Drawing Sheets

TILT CORRECTION METHOD DETECTING TILT WITH SAME LINEAR VELOCITY AS UPON ACTUALLY RECORDING/REPRODUCING AT EACH RADIAL POSITION

BACKGROUND OF THE INVENTION

1. Field of the Invention

The present invention generally relates to an optical disk device and a tilt correction method, and more particularly, to an optical disk device, a tilt correction method, a tilt control program, and a recording medium storing the tilt control program which have a function of correcting an angle of a laser so that the laser is always projected perpendicularly to a surface of an optical disk.

2. Description of the Related Art

Conventionally, an objective lens is used for condensing a recording/reproducing laser light and thereby forming a micro optical spot on a track of an optical disk. When an optical axis of the objective lens is inclined with respect to the optical disk, an aberration of the optical spot occurs, possibly causing trouble to the recording/reproduction. To prevent this trouble, an inclination of the objective lens to a recording surface of the optical disk needs to be made as small as possible.

As for the optical disk, CDs, such as a CD-ROM, a CD-R and a CD-RW, are widespread. Remarkably, in recent years, DVDs have begun to emerge with a higher track density and a larger capacity than the CDs. DVDs for reproduction have already been prevalent in general, and DVDs for recording have been put into practical use.

As such optical disk has a higher density, a numerical aperture of the objective lens needs to be made larger; accordingly, the objective lens increasingly needs to be prevented from inclining with respect to the recording surface of the optical disk.

Conventionally, Japanese Patent No. 3114661 (Japanese Laid-Open Patent Application No. 11-39683) and Japanese Laid-Open Patent Application No. 2000-339727 disclose examples of an optical disk device that measures tilts at radial positions of a disk and stores the measured tilts beforehand, and corrects the tilts according to the stored tilts upon a recording/reproduction.

By the way, as shown in FIG. 1, a warp of the optical disk changes according to a rotational velocity. Specifically, as the rotational velocity becomes larger, a flatness of the optical disk becomes improved due to a centrifugal force; accordingly, the warp of the optical disk reduces. According to the reduction of the warp of the optical disk, the tilt of the optical disk decreases. That is, when a measuring of tilts of the optical disk and an actual recording/reproducing of the optical disk are performed at different rotational velocities, the tilts are corrected differently from originally intended. Especially, according to a CLV (Constant Linear Velocity) method, a recording/reproduction of a CD-R/RW or a DVD+R/RW is performed at a high rotational velocity for an inner part thereof, and is performed at a low rotational velocity for an outer part thereof; therefore, a measuring of tilts of the optical disk and an actual recording/reproducing of the optical disk are performed at different rotational velocities. Besides, the recording/reproduction may be performed at various velocities changed optimally according to characteristics of the optical disk; also in this case, a measuring of tilts of the optical disk and an actual recording/reproducing of the optical disk are performed at different rotational velocities. Consequently, the tilts are corrected according to incorrect tilt detection data, causing a problem of deteriorated qualities of the recording/reproduction.

Further, in an optical disk device, upon application of power and during operation, a spindle motor, a seek motor, a laser diode, and elements of a circuit generate heat by energy consumption, and accordingly, the temperature of an optical disk and an optical pickup rises. The temperature rise of the optical disk may possibly change a tilt of the optical disk, and the temperature change in elements of the optical pickup may possibly change an optimal angle of the optical pickup. In this case, when a tilt correction is performed according to a tilt measured beforehand, the tilt correction is performed differently from an originally intended tilt correction, possibly imposing a negative influence on recording/reproducing qualities.

Especially, when continuing a recording to the optical disk for a long time, the temperature rise during the recording may likely change tilt characteristics of the optical disk and the optical pickup, and therefore, a proper tilt correction cannot be performed, which deteriorates a quality of the recording, and may cause a write error. When a write error occurs in a (write-once) optical disk, such as a CD-R or a DVD+R, on which information can be written once, the write error may possibly waste the optical disk.

SUMMARY OF THE INVENTION

It is a general object of the present invention to provide an improved and useful optical disk device, a tilt correction method, a tilt control program, and a recording medium storing the tilt control program in which the above-mentioned problems are eliminated.

A more specific object of the present invention is to provide an optical disk device, a tilt correction method, a tilt control program, and a recording medium storing the tilt control program which enable a tilt correction to be performed correctly.

In order to achieve the above-mentioned objects, there is provided according to one aspect of the present invention a tilt correction method in an optical disk device including a spindle motor rotationally driving an optical disk, an optical pickup projecting a light on the rotating optical disk so as to record or reproduce information, a tilt detection part detecting a relative tilt between the optical disk and the optical pickup, an optical-pickup-position detection part detecting a position of the optical pickup in a radial direction of the optical disk, a tilt storage part for storing tilt detection data output from the tilt detection part, and a tilt correction part correcting the tilt according to the tilt detection data stored in the tilt storage part, the method including the steps of moving the optical pickup to a plurality of measuring positions set beforehand in the radial direction of the optical disk, prior to recording or reproducing the information, and detecting the tilt with the spindle motor being rotated so that a linear velocity at each of the measuring positions equals a linear velocity upon actually recording or reproducing the information thereat.

According to the present invention, upon detecting the tilt and storing the tilt detection data in the tilt storage part beforehand, the optical disk is rotated at the same rotational velocity as upon actually recording/reproducing. This enables a detection of a tilt equal to a tilt upon actually recording/reproducing. Thus, an accurate tilt correction can be performed.

Additionally, in the optical disk device according to the present invention, when a predetermined time elapses after detecting the tilt at each of the measuring positions and storing the tilt detection data in the tilt storage part, the tilt at each of the measuring positions may be detected again, and the tilt detection data stored in the tilt storage part may be updated.

According to the present invention, even when optimal tilt amounts of the optical disk and the optical pickup change according to a temperature change during operation, tilt detection data is obtained anew; accordingly, a tilt correction of the optical disk can be performed appropriately.

Additionally, in the optical disk device according to the present invention, when the recording is being performed when a predetermined time elapses after detecting the tilt at each of the measuring positions and storing the tilt detection data in the tilt storage part, the recording may be interrupted, the tilt at each of the measuring positions may be detected again, and the tilt detection data stored in the tilt storage part may be updated, and thereafter, recording data continuous to data recorded immediately before the recording being interrupted may be synchronized with data already recorded on the optical disk, and the recording may be resumed by recording the recording data seamlessly at an end of the data recorded immediately before the recording being interrupted.

According to the present invention, even when optimal tilt amounts of the optical disk and the optical pickup change according to a temperature change during recording, the recording is interrupted, tilt detection data is obtained anew, and the recording is continued seamlessly. Therefore, an appropriate tilt correction can be performed, and the recording can be completed without deteriorating a quality of the recording.

Additionally, the optical disk device according to the present invention may further comprise a temperature detection part, wherein when an output of the temperature detection part changes by equal to or more than a predetermined value from an output of the temperature detection part output upon detecting the tilt at each of the measuring positions and storing the tilt detection data in the tilt storage part, the tilt at each of the measuring positions may be detected again, and the tilt detection data stored in the tilt storage part may be updated.

According to the present invention, even when optimal tilt amounts of the optical disk and the optical pickup change according to a temperature change during recording, the recording is interrupted, tilt detection data is obtained anew, and the recording is continued seamlessly. Therefore, an appropriate tilt correction can be performed, and the recording can be completed without deteriorating a quality of the recording.

Additionally, in the optical disk device according to the present invention, the temperature detection part may be provided on the optical pickup.

According to the present invention, the temperature change of the optical pickup can be detected accurately.

Additionally, in the optical disk device according to the present invention, the temperature detection part may be provided adjacent to the optical disk.

According to the present invention, the temperature change of the optical disk can be detected accurately.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 1:
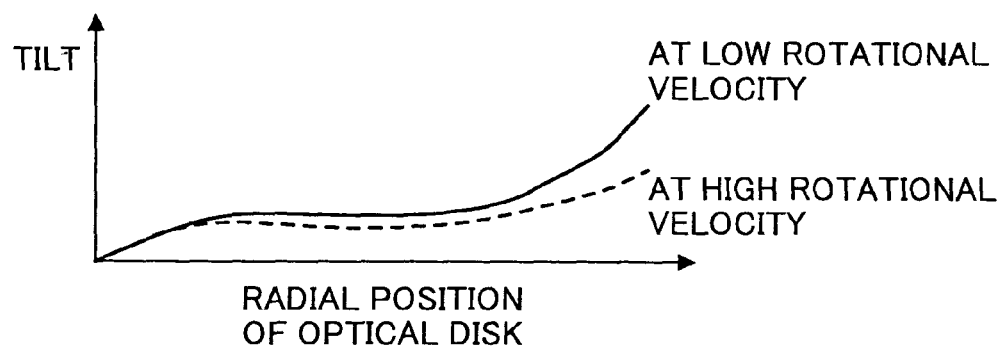
FIG. 1 is a graph showing tilts at radial positions of an optical disk rotating at a high velocity and at a low velocity.
Figure 2:
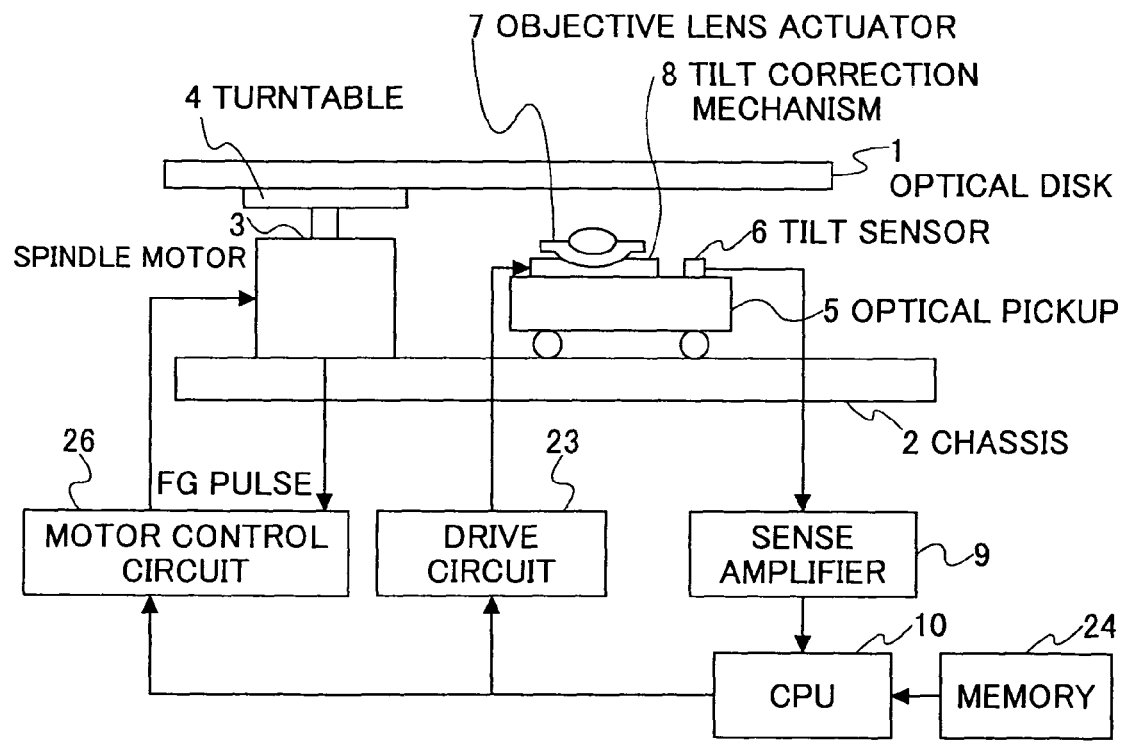
FIG. 2 is a block diagram showing a main configuration of an optical disk device according to a first embodiment of the present invention.

FIG. 2 is a block diagram showing a main configuration of an optical disk device according to a first embodiment of the present invention. As shown in FIG. 2, the configuration involves an optical disk 1, a chassis 2, a spindle motor 3 fixed to the chassis 2, and a turntable 4 fixed to the spindle motor 3. The optical disk 1 placed on the turntable 4 is rotationally driven by the spindle motor 3. The configuration also involves an optical pickup 5 projecting a laser light on the optical disk 1, a tilt sensor 6 (a tilt detection part) mounted on the optical pickup 5 and detecting a radial tilt between a (recording) surface of the optical disk 1 and the laser light, and an objective lens actuator 7, a tilt correction mechanism 8 (a tilt correction part) correcting an angle of the laser by mechanically inclining an optical axis of an objective lens so that the laser light of the optical pickup 5 is always projected perpendicularly to the surface of the optical disk 1, a sense amplifier 9, a CPU 10 (a control part, a rotational velocity calculation part), a drive circuit 23 performing a drive control of the optical pickup 5, a memory 24 (a tilt storage part), and a motor control circuit 26 (a rotation control part) performing a drive control of the spindle motor 3. The optical pickup 5 is supported on the chassis 2 movably in a radial direction of the optical disk 1. The objective lens actuator 7 is mounted on the optical pickup 5 via the tilt correction mechanism 8. Besides, in the following description, "radial direction" means the radial direction of the optical disk 1 in which the optical pickup 5 moves.

The optical pickup 5 is mounted on a driving mechanism driven in the radial direction by a lead screw (not shown in the figures) driven by a stepping motor. A radial position of the optical pickup 5 can be specified by counting driving pulses of the stepping motor from an inner reference position.

Besides, the optical disk device according to the present invention is capable of performing a recording/reproduction to/from a CD-R/RW or a DVD+R/RW as by a CLV method, in which the spindle motor 3 is controlled so that a linear velocity of the optical disk 1 becomes constant in the course of moving the optical pickup 5. Upon actually performing a recording/reproduction, a rotation of the spindle motor 3 is controlled according to a synchronization signal provided beforehand on the optical disk 1 so that the linear velocity becomes constant. For a disk on which information is to be recorded, the above-mentioned synchronization signal provided beforehand on the optical disk 1 is a wobble signal engraved beforehand on the optical disk 1 by a wobbling track mentioned hereinafter. Besides, for a disk on which information is already recorded, and for a disk used exclusively for reproduction, an information signal per se functions as a synchronization signal.

The tilt sensor 6 comprises a light-emitting element and a bipartite light-receiving element. A light is projected from the light-emitting element to a detection object, i.e., the optical disk 1, and a reflected light therefrom is received by the light-receiving element. Light-receiving signals of the bipartite light-receiving element are amplified by the sense amplifier 9, and a subtraction result between the two signals is transmitted to the CPU 10 as a tilt signal.

Figure 3:
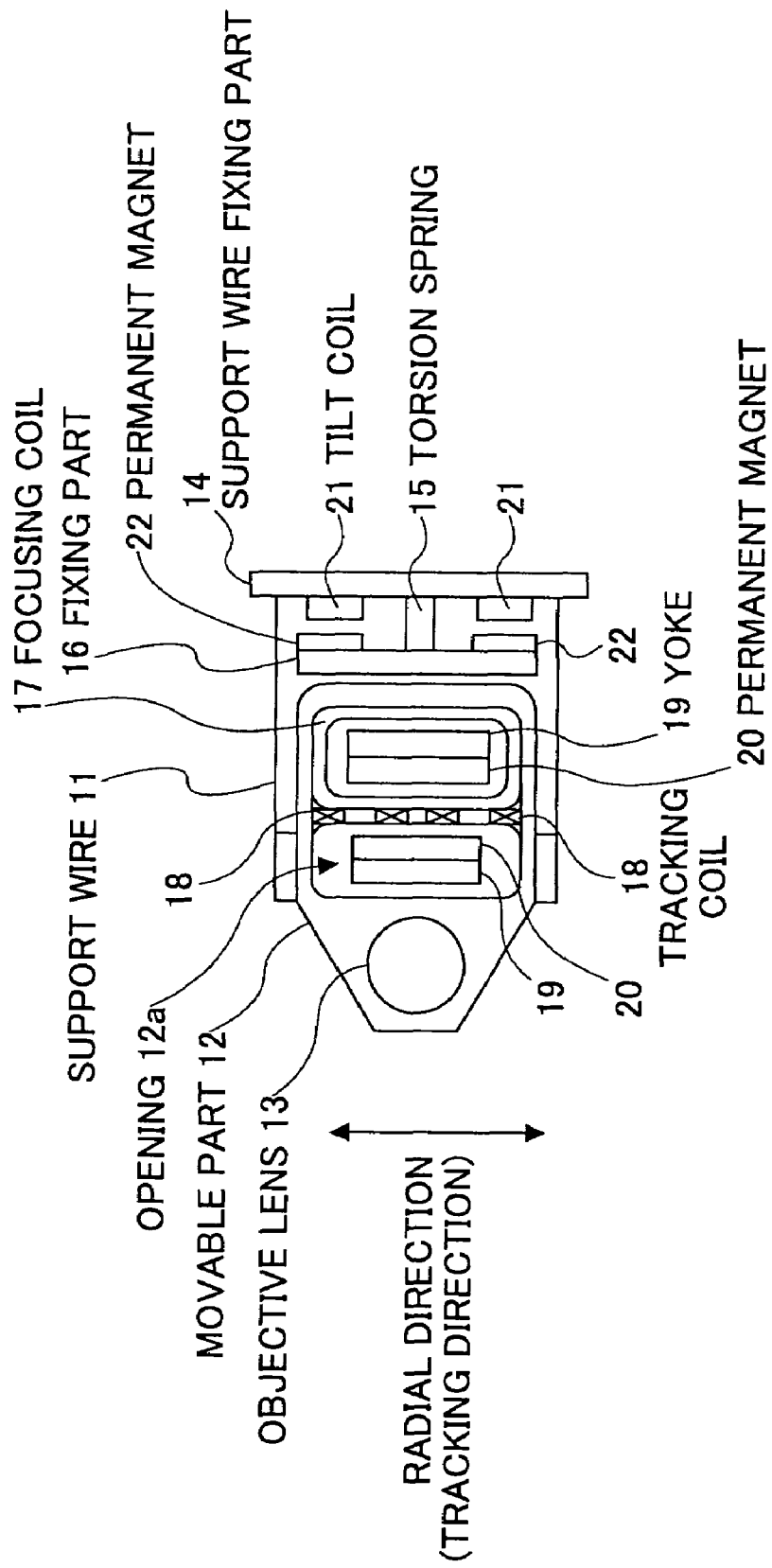
FIG. 3 is a plan view showing a structure of an objective lens actuator and a tilt correction mechanism shown in FIG. 2.
Figure 4:
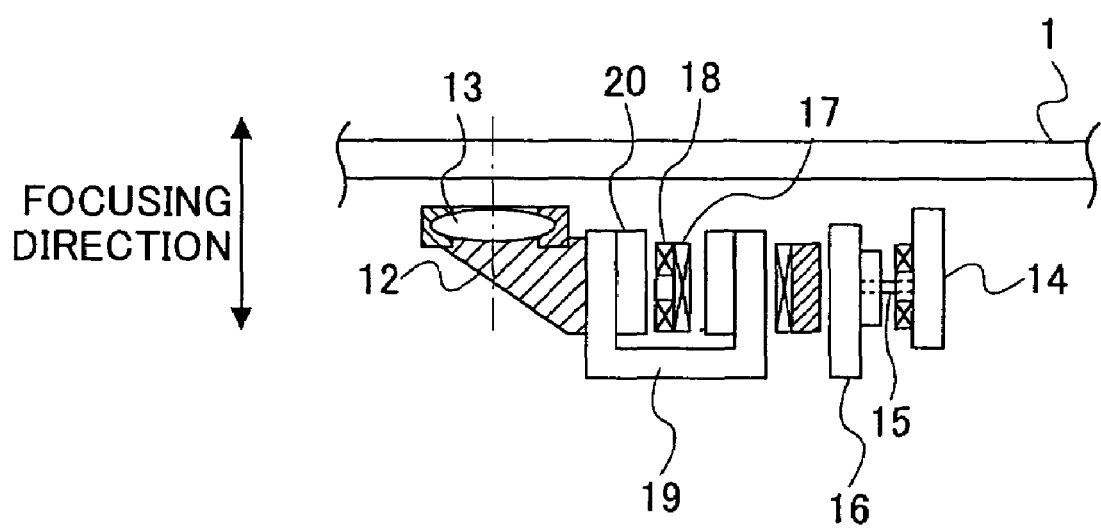
FIG. 4 is a sectional view of the structure shown in FIG. 3.

FIG. 3 is a plan view showing a structure of the objective lens actuator 7 and the tilt correction mechanism 8. FIG. 4 is a sectional view of the structure shown in FIG. 3. As shown in FIG. 3 and FIG. 4, the structure involves support wires 11, a movable part 12, an objective lens 13, a support wire fixing part 14, a torsion spring 15, and a fixing part 16. The objective lens 13 is fixed to the movable part 12. One-end parts of the support wires 11 are fixed to the movable part 12, and other-end parts of the support wires 11 are fixed to the support wire fixing part 14. The movable part 12 is supported movably in a focusing direction and a tracking direction by the two support wires 11 at each side totaling four. Further, the support wire fixing part 14 is supported on the fixing part 16 rotatably in the radial direction by the torsion spring 15. Besides, in the present embodiment, since the optical pickup 5 moves in the radial direction, the radial direction and the tracking direction are the same directions. In addition, the movable part 12 attached with the objective lens 13 and so forth is especially referred to as an optical head.

Also, as shown in FIG. 3 and FIG. 4, the structure involves a cylindrical focusing coil 17, a spiral tracking coil 18, a yoke 19, permanent magnets 20, a spiral tilt coil 21, and a permanent magnet 22. An opening 12a is formed in a central part of the movable part 12. The focusing coil 17 is fixed to a wall surface in the opening 12a at an end near to the support wire fixing part 14. The tracking coil 18 is fixed to a surface of the focusing coil 17 at an end near to the objective lens 13. The opening 12a of the movable part 12 is divided substantially into two regions by the focusing coil 17. Portions of the yoke 19 at both ends are disposed in the respective two regions of the opening 12a. The permanent magnets 20 are fixed on the portions of the yoke 19 so as to flank the focusing coil 17. The tracking coil 18 faces the permanent magnet 20 fixed on the portion of the yoke 19 at an end near to the objective lens 13. The above-mentioned optical head is driven in the focusing and tracking directions by magnetic fields of the permanent magnets 20 fixed to the yoke 19 and currents applied to the focusing coil 17 and the tracking coil 18.

The tilt coil 21 is fixed to the support wire fixing part 14. The permanent magnet 22 is fixed to the fixing part 16 at a position opposing the tilt coil 21. A tilt correction is performed by controlling a current applied to the tilt coil 21 via the drive circuit 23 according to instructions from the CPU 10, and thereby controlling an amount of rotation of the support wire fixing part 14.

Figure 5:
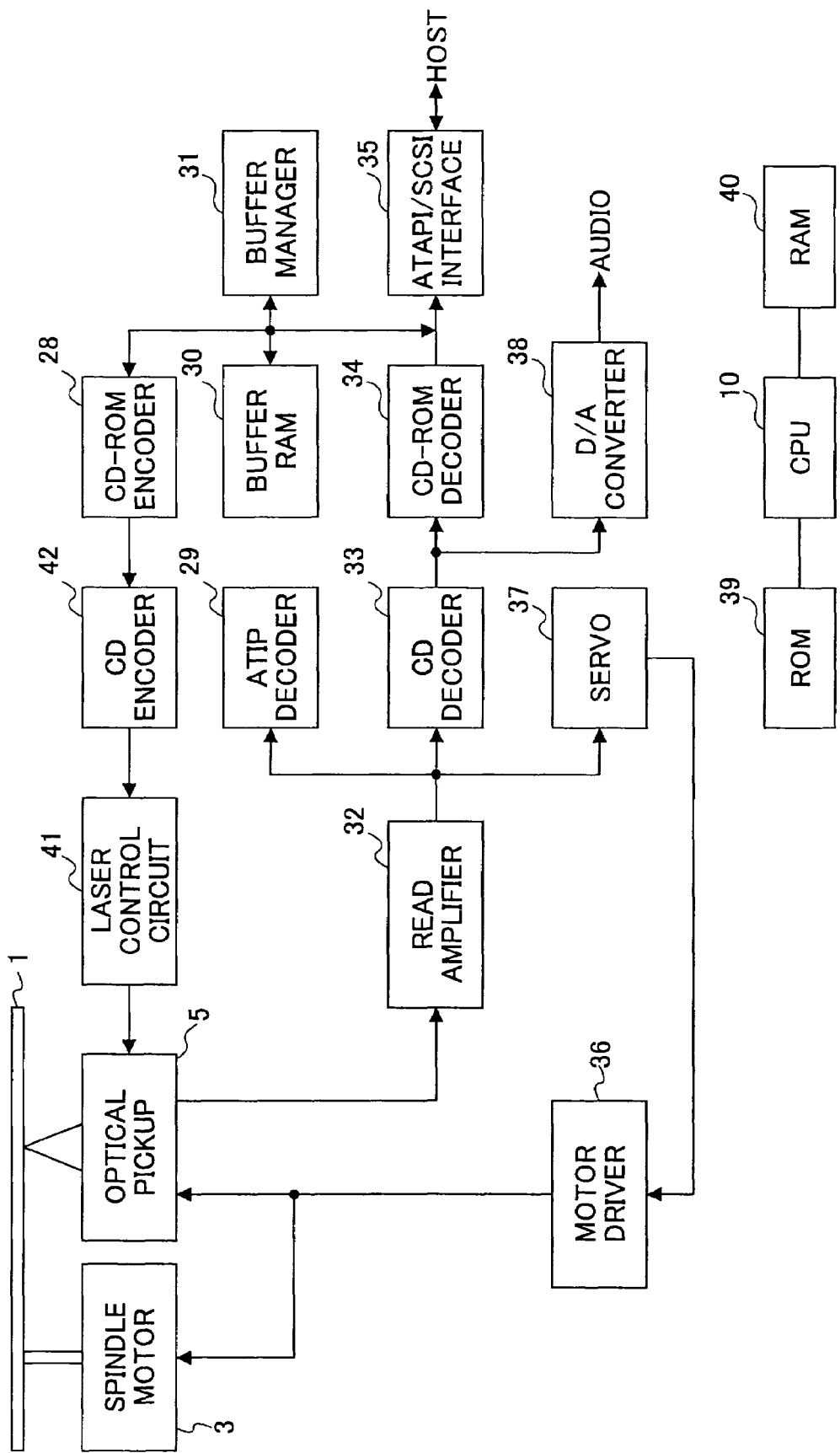
FIG. 5 is a block diagram showing a control system of the optical disk device according to the first embodiment of the present invention.

FIG. 5 is a block diagram showing a control system of the optical disk device of the present first embodiment. As shown in FIG. 5, the control system of the optical disk device comprises the optical disk 1, the spindle motor 3, the optical pickup 5, a laser control circuit 41, a CD encoder 42, a CD-ROM encoder 28, an ATIP decoder 29, a buffer RAM 30, a buffer manager 31, a read amplifier 32, a CD decoder 33, a CD-ROM decoder 34, an ATAPI/SCSI interface 35, a motor driver 36, a servo 37, a D/A converter 38, a ROM 39, the CPU 10 and a RAM 40.

The optical pickup 5 is provided with the tilt sensor 6 and the tilt correction mechanism 8, as shown in FIG. 2. The sense amplifier 9 in FIG. 2 is equivalent to the read amplifier 32 in FIG. 5. Similarly, the drive circuit 23 is equivalent to the motor driver 36, the memory 24 is equivalent to the RAM 40, and the motor control circuit 26 is equivalent to the servo 37, achieving respective functions.

The optical disk 1 is rotationally driven by the spindle motor 3. The spindle motor 3 is controlled by the motor driver 36 and the servo 37 so that the linear velocity becomes constant. The linear velocity can be varied by steps. The optical pickup 5 incorporates a semiconductor laser, an optical system, the objective lens actuator 7, a light-receiving element, and a position sensor, and so forth. The laser light is projected on the recording surface of the optical disk 1, and the laser light reflected on the optical disk 1 is detected by the light-receiving element as a focus error signal, a track error signal, a reflectance detection signal, and a reproduction signal.

The optical pickup 5 is movable in the radial direction by a seek motor. The objective lens actuator 7 is controlled by the motor driver 36 and the servo 37 according to the focus error signal and the track error signal obtained from the light-receiving element so as to form a laser spot on the track of the optical disk 1. The seek motor is controlled by the motor driver 36 and the servo 37 according to a signal obtained from the position sensor so that the laser spot is located at a target position on the optical disk 1.

Upon reproducing data from the optical disk 1, the reproduction signal obtained by the optical pickup 5 is amplified and digitized by the read amplifier 32, thereafter is supplied to the CD decoder 33, and is therein subjected to processes of de-interleaving and error correction. Further, the data having undergone the processes of de-interleaving and error correction is supplied to the CD-ROM decoder 34, and is subjected to a process of error correction so as to enhance a reliability of the data.

The data processed by the CD-ROM decoder 34 is temporarily stored in the buffer RAM 30 by the buffer manager 31. When the stored data is accumulated so as to form sector data, the sector data is transferred to a host at one time by the ATAPI/SCSI interface 35. In a case of music data, the data output from the CD decoder 33 is supplied to the D/A converter 38, whereby an analog audio signal is taken out.

Upon recording data, when data transferred from the host is received by the ATAPI/SCSI interface 35, the data is temporarily stored in the buffer RAM 30 by the buffer manager 31.

When the stored data is accumulated to a certain amount in the buffer RAM 30, the recording is started. Prior to the start of the recording, the laser spot is located at a start position of writing data. This start position is obtained by the wobble signal engraved beforehand on the optical disk 1 by the wobbling track. The wobble signal includes absolute time information referred to as ATIP. The ATIP information is extracted by the ATIP decoder 29.

A synchronization signal generated by the ATIP decoder 29 is supplied to the CD encoder 42 so as to start writing data at an accurate position. The data stored in the buffer RAM 30 is subjected to processes of adding an error correction code and interleaving in the CD-ROM encoder 28 and the CD encoder 42, and is recorded on the optical disk 1 via the laser control circuit 41 and the optical pickup 5.

Prior to recording/reproducing, the optical pickup 5 is moved to a plurality of positions along the radial direction, and tilts of the optical disk 1 at the respective positions are detected by the tilt sensor 6, and are stored in the RAM 40 (the memory 24) as tilt detection data composed of a tilt amount for each of the positions of the optical head (the optical pickup 5).

In the course of moving the optical pickup 5 for measuring the tilts, a rotational velocity of the spindle motor 3 at each of the radial positions is calculated so that the linear velocity of the optical disk 1 at the radial positions becomes constant, i.e., so that a relative velocity between the optical disk 1 and the laser spot projected on the optical disk 1 becomes constant, and the spindle motor 3 is controlled at each of the rotational velocities.

A formula for calculating the rotational velocity is as follows.

$$N=LV*M/(2*\pi*R),$$  Formula 1 where N (/s) is a rotational frequency of the spindle motor 3, LV (m/s) is a linear velocity, M is a multiplier rate, and R (m) is a radial position.

The linear velocity LV is a value specific to a type of the optical disk. For example, the linear velocity LV is 1.2-1.4 (m/s) for a CD, and is 3.49 (m/s) for a DVD. The multiplier rate M is set from a host computer, etc., connected with the optical disk device.

The CPU 10 calculates the rotational frequency N from the radial position (R) of the optical pickup 5, and provides a target frequency to the motor control circuit 26. The rotation of the spindle motor 3 is controlled so that a number of FG pulses output a constant number of times (for example, six times) in one rotation equals the target frequency N*6. By the way, the rotation of the spindle motor 3 may be controlled with higher precision when using the synchronization signal provided beforehand on the disk, as in the rotation control upon recording/reproducing as described above. However, using the synchronization signal takes time, because a focusing servo and a tracking servo need to be involved so as to be synchronized with the synchronization signal. Since a strict control precision is not required upon measuring the tilts, the above-described control using the FG pulses enables a control of the spindle motor 3 at desired rotational velocities in a short time with ease, because the focusing servo and the tracking servo need not be involved so as to be synchronized with the synchronization signal. Besides, in a case of recording or reproducing information by a CAV (Constant Angular Velocity) method, the optical disk 1 is rotated at a constant rotational velocity set by a user or at a constant rotational velocity set by a well-known method according to types and characteristics of the optical disk. In this case, the CPU 10 may perform a rotation control by issuing an instruction to the motor control circuit 26 so that the spindle motor 3 rotates at the constant rotational velocity, irrespective of the radial position of the optical pickup 5.

During recording/reproducing, the tilt detection data corresponding to a position of the optical pickup 5 (the optical head) obtained from an optical-pickup-position detection means, such as the position sensor or by counting the driving pulses of the stepping motor mounted on the driving mechanism, is read from the RAM 40, and a tilt correction is performed by applying a current to the tilt coil 21 shown in FIG. 3 via the motor driver 36 according to the tilt detection data.

Figure 6:
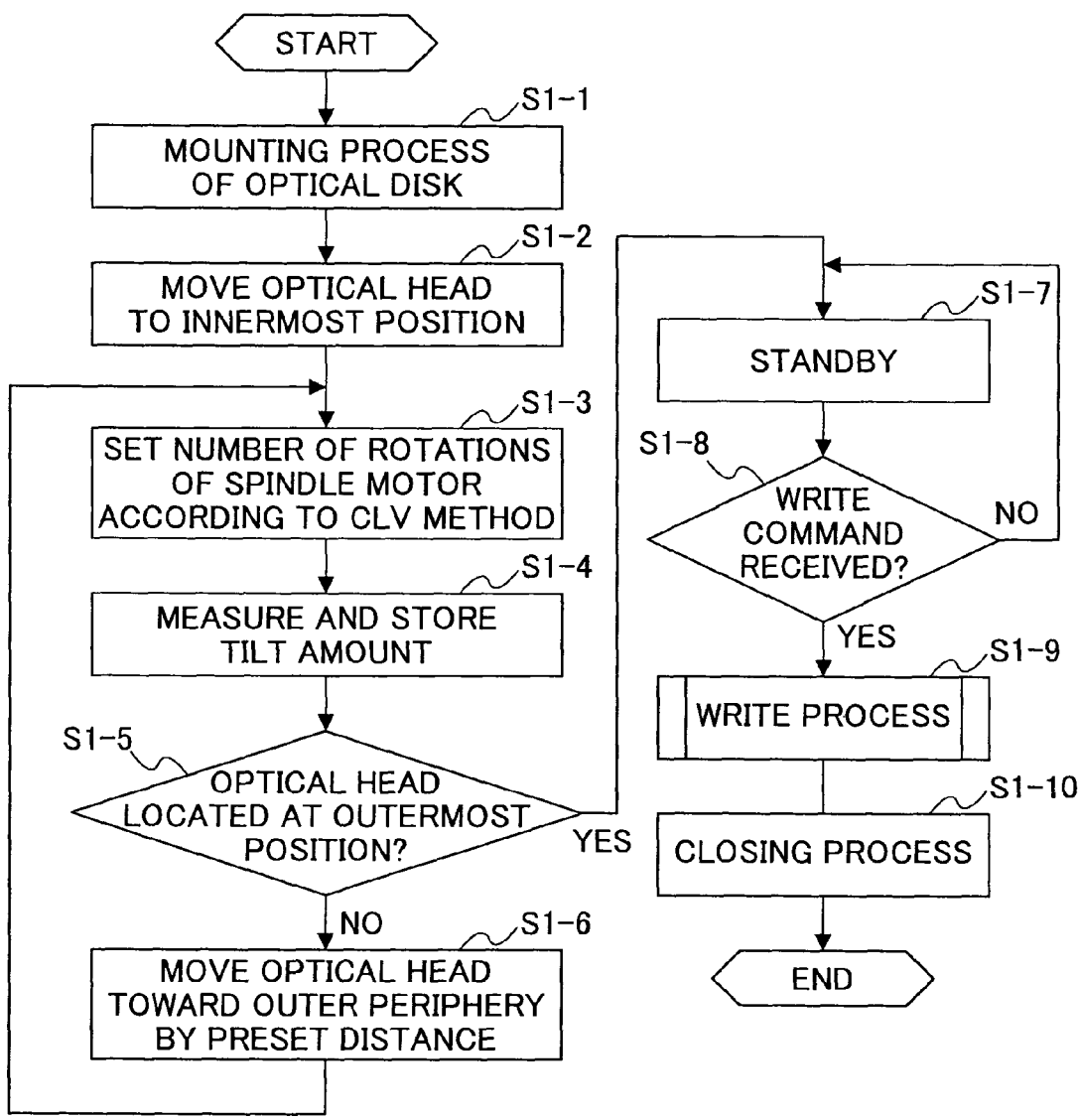
FIG. 6 is a flowchart showing a procedure of measuring tilt amounts corresponding to positions of an optical head in the optical disk device according to the first embodiment of the present invention.

FIG. 6 is a flowchart showing a procedure of measuring tilt amounts corresponding to positions of the optical head. The procedure shown in this flowchart is performed by the CPU 10 issuing instructions to each part of the optical disk device of the present invention according to control programs stored in the ROM 39. Measurement of tilt amounts corresponding to positions of the optical head is performed once, prior to recording/reproducing information to/from the optical disk 1. A plurality of positions for measuring tilt amounts are set beforehand in a moving range of the optical pickup 5. In the present embodiment, three positions on the optical disk 1, i.e., an innermost position, an outermost position and an intermediate position therebetween, are set as the positions for measuring tilt amounts (hereinafter also referred to as tilt-amount measuring position). Besides, the number of the positions for measuring tilt amounts, or specific positions for measuring tilt amounts, may be set suitably.

First, upon setting the optical disk 1 in the optical disk device, a mounting process is performed in the optical disk device (S1-1), and the optical pickup 5 is moved to an inner periphery of the optical disk 1, and is stopped when a limit switch not shown in the figures turns on (S1-2). This position at which the limit switch turns on is the inner reference position of the optical pickup 5.

Next, a number of rotations (a rotational velocity) of the spindle motor 3 is set to a number according to the CLV method. In this procedure, since the optical head is at first located in the innermost position, the number of rotations is set to a number corresponding to the innermost position (S1-3). Then, the tilt detection data measured at the innermost position by the tilt sensor 6 is stored in the memory 24 (S1-4). Next, it is judged whether the optical head is at the outermost position (S1-5). When the optical head is not at the outermost position (N in S1-5), the optical pickup 5 is moved toward an outer periphery by a preset distance so that the optical head is located at the next tilt-amount measuring position (S1-6). The rotational velocity of the spindle motor 3 is controlled according to this tilt-amount measuring position (S1-3). When the optical head is moved to this next tilt-amount measuring position, the tilt detection data measured thereat by the tilt sensor 6 is stored in the memory 24 (S1-4). Thus, tilt amounts are repeatedly measured at a plurality of the preset tilt-amount measuring positions. When it is judged that the optical head reaches the outermost position (Y in S1-5), the optical pickup 5 stands by until a write command is received (S1-7, S1-8). Upon standing by, the optical pickup 5 may be returned to the inner reference position, or the optical pickup 5 may stand by at a last position of data written in the optical disk 1. Otherwise, the optical pickup 5 may stand by in a state where a tilt correction is performed according to the tilt amount written in the memory 24. When the write command is received (Y in S1-8), a write process is performed (S1-9), and a closing process is performed after completion of the write process (S1-10). When recording or reproducing information by the CAV method, the number of rotations of the spindle motor 3 is set to a number according to the CAV method in S1-3 as described above, and S1-4 instead of S1-3 is controlled to be performed after S1-6.

Upon recording/reproducing, a tilt correction is performed by applying a current to the tilt coil 21 shown in FIG. 3 via the drive circuit 23 shown in FIG. 2 according to the above-stored tilt detection data corresponding to each of the tilt-amount measuring positions.

Figure 7:
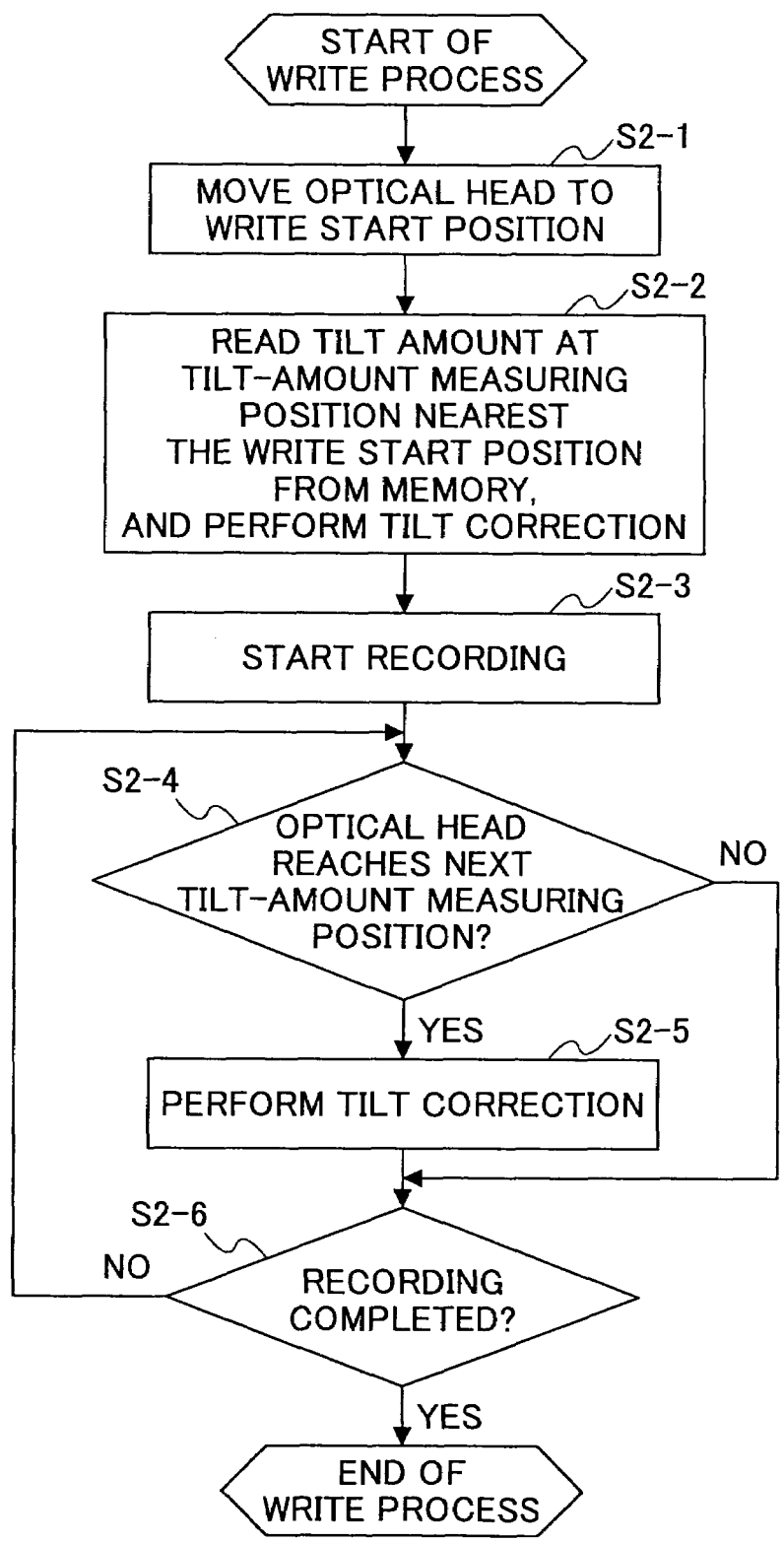
FIG. 7 is a flowchart showing a first example of controlling a write process shown in FIG. 6.
Figure 8:
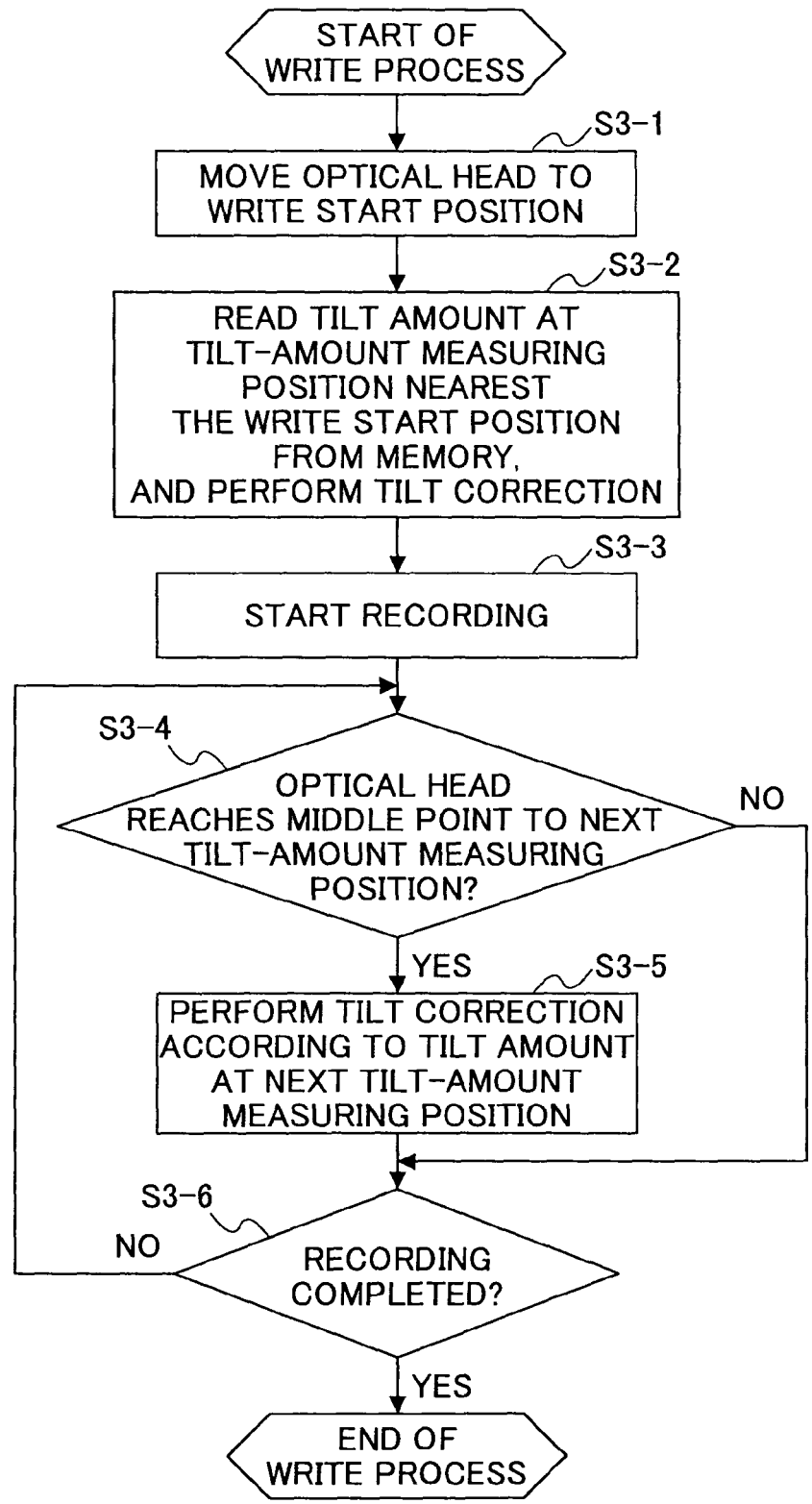
FIG. 8 is a flowchart showing a second example of controlling the write process shown in FIG. 6.
Figure 9:
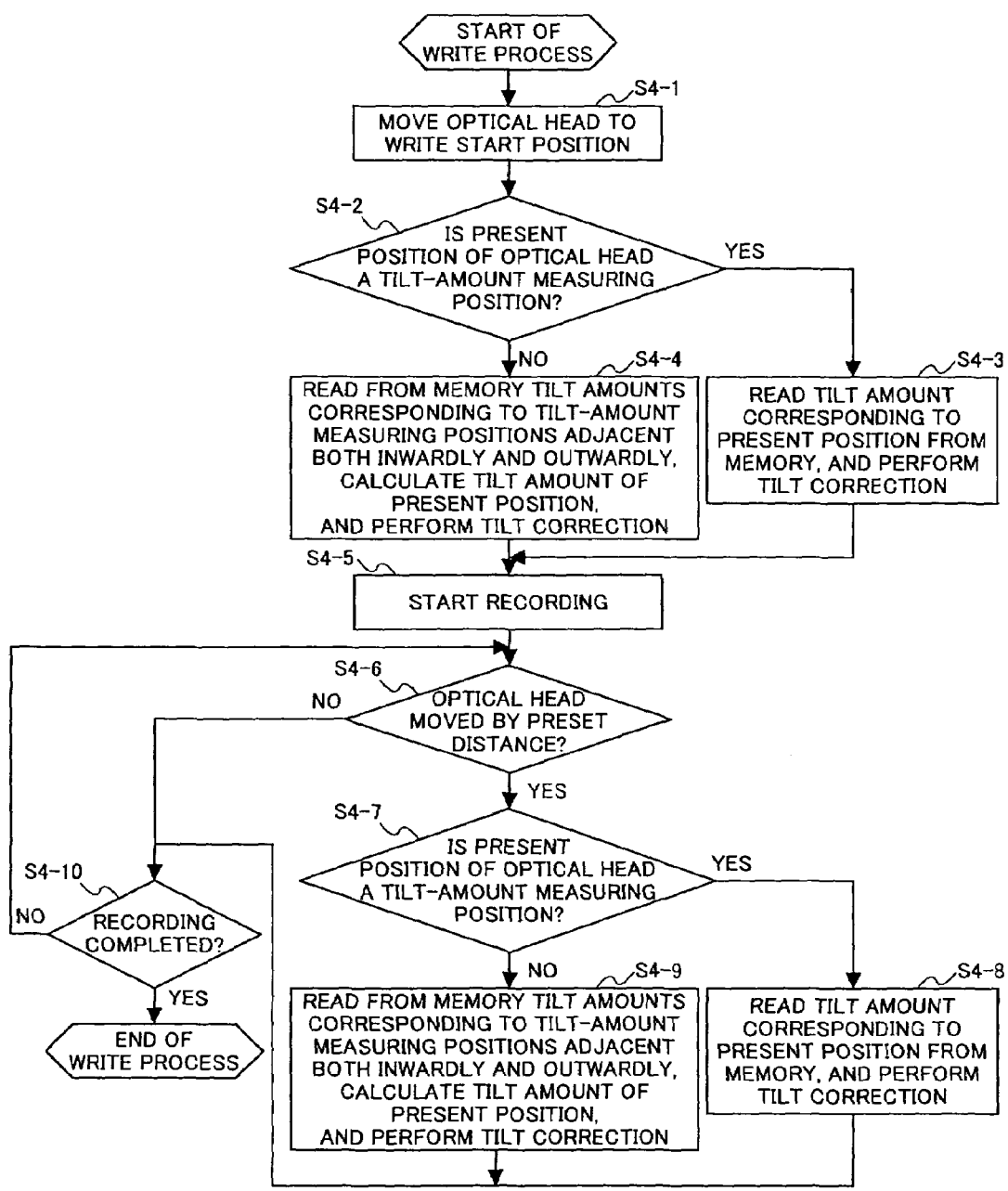
FIG. 9 is a flowchart showing a third example of controlling the write process shown in FIG. 6.

FIG. 7 to FIG. 9 are flowcharts each showing a control in the write process shown in FIG. 6.

EXAMPLE 1

When the write command is received, the optical head is first moved to a write start position (S2-1) as shown in FIG. 7. Thereafter, a tilt amount at a tilt-amount measuring position nearest the write start position is read from the memory 24, and a tilt correction is performed according to the read tilt amount (S2-2), and thereafter, a recording is started (S2-3). During the recording, the position of the optical head is monitored (S2-4). When the optical head reaches the next tilt-amount measuring position (Y in S2-4), a tilt correction amount corresponding to the tilt-amount measuring position is read from the memory 24, and a tilt correction is performed according to the read tilt amount (S2-5). Then, when the recording is completed (Y in S2-6), the closing process follows the write process.

EXAMPLE 2

When the write command is received, the optical head is first moved to a write start position (S3-1) as shown in FIG. 8. Thereafter, a tilt amount at a tilt-amount measuring position nearest the write start position is read from the memory 24, and a tilt correction is performed according to the read tilt amount (S3-2), and thereafter, a recording is started (S3-3). During the recording, the position of the optical head is monitored. S3-1 to S3-3 in Example 2 are identical to S2-1 to S2-3 in Example 1. Then, it is judged whether the optical head reaches a middle point to the next tilt-amount measuring position (S3-4). When the optical head reaches the middle point (Y in S3-4), a tilt correction amount corresponding to the next tilt-amount measuring position is read from the memory 24, and a tilt correction is performed according to the read tilt amount (S3-5). Then, when the recording is completed (Y in S3-6), the closing process follows the write process.

EXAMPLE 3

When the write command is received, the optical head is first moved to a write start position (S4-1) as shown in FIG. 9. Thereafter, it is judged whether the present position of the optical head is a tilt-amount measuring position (S4-2). When the present position of the optical head is a tilt-amount measuring position (Y in S4-2), a tilt amount corresponding to the present position is read from the memory 24, and a tilt correction is performed according to the read tilt amount (S4-3). When the present position of the optical head is not a tilt-amount measuring position (N in S4-2), tilt amounts corresponding to tilt-amount measuring positions adjacent to the present position both inwardly and outwardly are read from the memory 24, and a tilt amount of the present position is calculated by a proportional calculation, and then, a tilt correction is performed according to the calculated tilt amount (S4-4).

Thus, after performing the tilt correction at the write start position, a recording is started (S4-5). During the recording, the position of the optical head is monitored, and each time the optical head moves by the preset distance, a tilt correction at the present position of the optical head is performed. Specifically, after the recording being started, when the optical head moves by the preset distance (Y in S4-6), it is judged whether the present position of the optical head is a tilt-amount measuring position (S4-7). When the present position of the optical head is a tilt-amount measuring position (Y in S4-7), a tilt amount corresponding to the present position is read from the memory 24, and a tilt correction is performed according to the read tilt amount (S4-8). When the present position of the optical head is not a tilt-amount measuring position (N in S4-7), tilt amounts corresponding to tilt-amount measuring positions adjacent to the present position both inwardly and outwardly are read from the memory 24, and a tilt amount of the present position is calculated by a proportional calculation, and then, a tilt correction is performed according to the calculated tilt amount (S4-9). Then, when the recording is completed (Y in S4-10), the closing process follows the write process.

Control programs for timing the tilt corrections as described above are stored in the ROM 39. Besides, examples of controlling the timing of the tilt corrections are not limited to the above-described Examples 1 to 3. For instance, tilt amounts corresponding to a plurality of tilt-amount measuring positions are measured as shown in FIG. 6, and an interpolative function of tilt amounts with respect to tilt-amount measuring positions is obtained by a quadratic approximation according to the measured tilt amounts, and is stored in the memory 24. Then, during recording, a tilt amount corresponding to a position of the optical head is calculated from the interpolative function, and a tilt correction is performed according to the calculated tilt amount. Besides, as the number of tilt-amount measuring positions is larger, the tilt amount is calculated with higher precision from the interpolative function.

According to the above-described first embodiment, rotational velocities of the spindle motor 3 upon obtaining tilt detection data and upon recording/reproducing are equal at the same radial position on the optical disk 1. Therefore, an accurate tilt correction can be performed without being influenced by changes in tilts caused by changes in rotational velocities.

Figure 10:
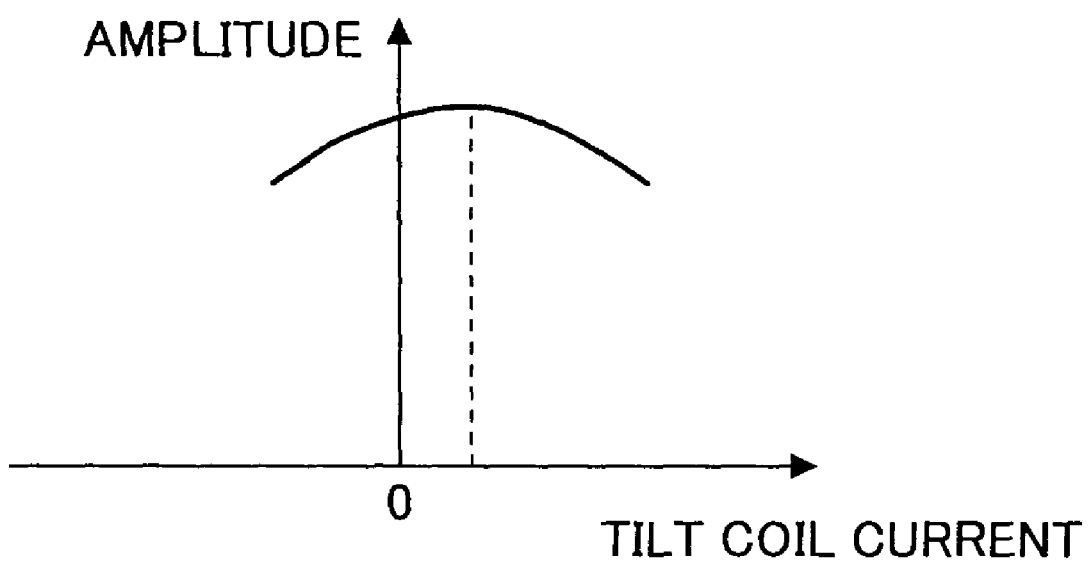
FIG. 10 is a graph showing amplitude of a track error signal with only a focusing servo on an optical disk shown in FIG. 2.

Besides, although a tilt amount is detected by using the tilt sensor 6 in the first embodiment, the tilt amount may be obtained from changes in a signal deriving from the optical pickup 5 with the current applied to the tilt coil 21 being changed. Amplitude of the track error signal with only a focusing servo on the optical disk 1 changes as shown in FIG. 10. That is, the inclination of the objective lens is substantially proportional to the current applied to the tilt coil 21 in a small range; therefore, the tilt amount can be converted from the tilt driving current maximizing the amplitude of the track error. Similarly, instead of the track error signal, an RF signal with a focusing servo and a tracking servo can be used for obtaining the tilt amount.

Figure 11:
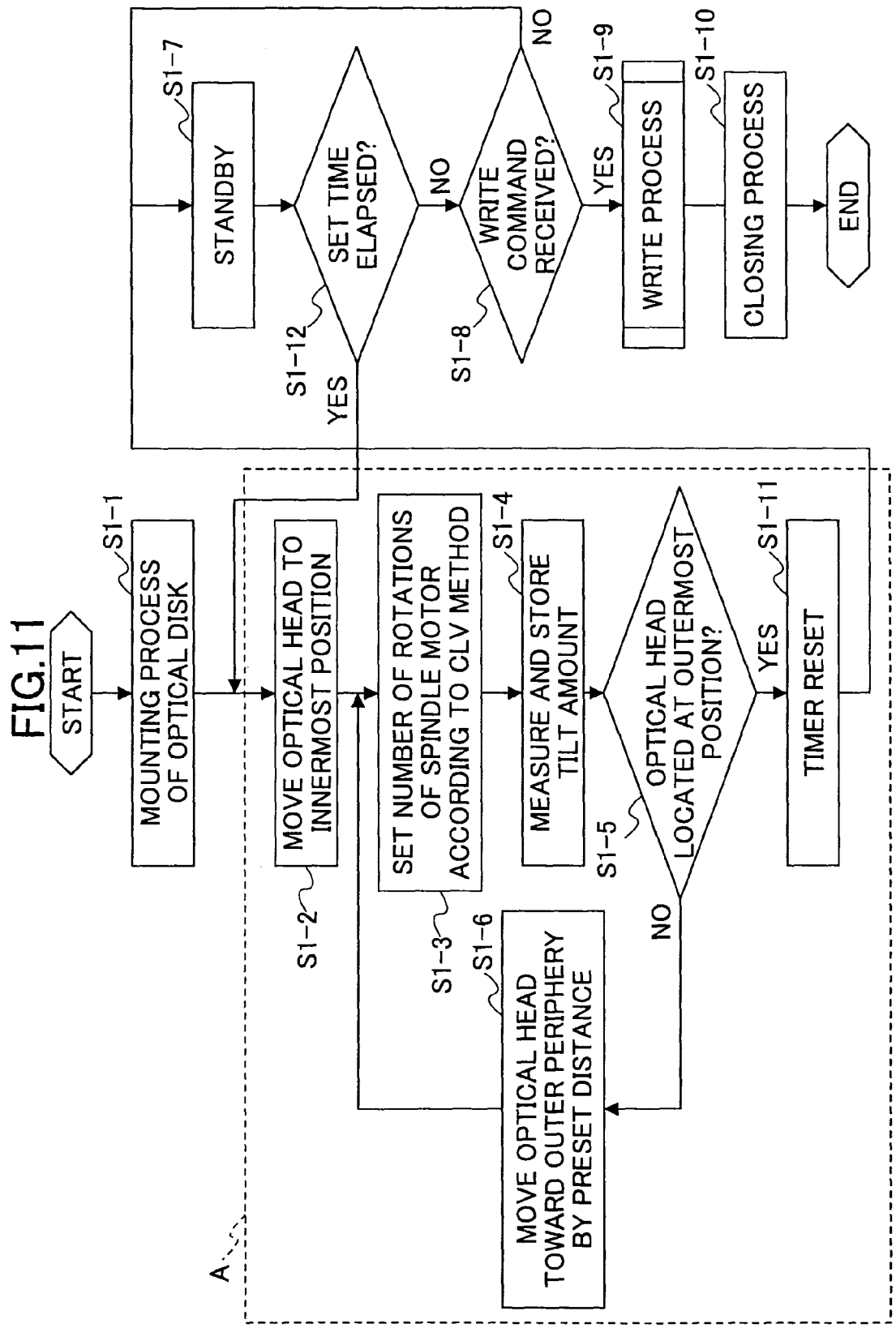
FIG. 11 is a flowchart showing a procedure of measuring tilt amounts corresponding to a plurality of tilt-amount measuring positions in an optical disk device according to a second embodiment of the present invention.

FIG. 11 is a flowchart showing a procedure of measuring tilt amounts corresponding to a plurality of tilt-amount measuring positions in an optical disk device according to a second embodiment of the present invention. Control steps in FIG. 11 that are identical to the control steps shown in FIG. 6 are referenced by the same step numbers, and will not be described in detail. Besides, when recording/reproducing information by the CAV method, the same control as in the foregoing first embodiment is performed. A basic configuration of the optical disk device according to the present second embodiment is the same as the optical disk device according to the foregoing first embodiment shown in FIG. 2.

As shown in FIG. 11, after the mounting process of the optical disk 1 (S1-1), the same control steps as in FIG. 6 are performed, and when it is judged that the optical head reaches the outermost position (Y in S1-5), a timer of the CPU 10 is reset and is started counting anew (S1-11); thereafter, a standby state commences (S1-7). During the standby state, it is judged whether the timer counts a set time (S1-12). When the timer does not count the set time (N in S1-12), it is judged whether the write command is received (S1-8). When the timer counts the set time (Y in S1-12), the optical head is moved to the innermost position (S1-2), and tilt amounts are again measured and stored (S1-3 to S1-6).

Figure 12:
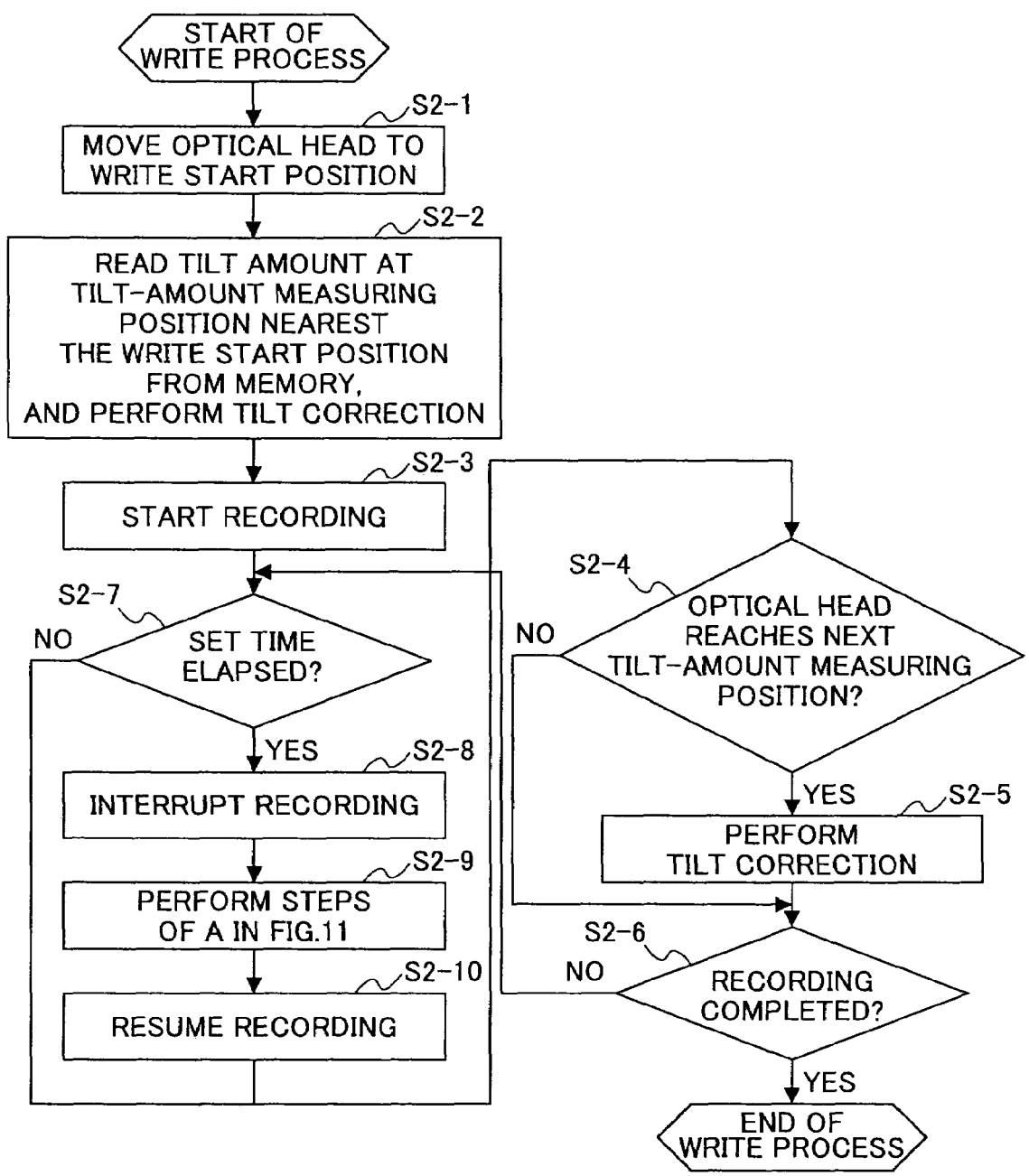
FIG. 12 is a flowchart showing an example of controlling a write process shown in FIG. 11.

FIG. 12 is a flowchart showing an example of controlling the write process shown in FIG. 11. Control steps in FIG. 12 that are identical to the control steps shown in FIG. 7 are referenced by the same step numbers, and will not be described in detail. In FIG. 12, control steps (S2-7) to (S2-10) are added between the control steps (S2-3) and (S2-4) shown in FIG. 7.

First, the optical head is moved to a write start position (S2-1). Thereafter, a tilt amount at a tilt-amount measuring position nearest the write start position is read from the memory 24, and a tilt correction is performed according to the read tilt amount (S2-2), and thereafter, a recording is started (S2-3). During the recording, the counting of the timer is monitored (S2-7). When a set time has not elapsed (N in S2-7), it is judged whether the optical head reaches the next tilt-amount measuring position (S2-4). When the optical head reaches the next tilt-amount measuring position (Y in S2-4), a tilt amount corresponding to the tilt-amount measuring position is read from the memory 24, and a tilt correction is performed according to the read tilt amount (S2-5). Thereafter, the counting of the timer is again monitored (S2-7). When the optical head does not reach the next tilt-amount measuring position (N in S2-4), the counting of the timer is again monitored (S2-7). When the set time has elapsed (Y in S2-7), the recording is interrupted (S2-8), and the steps indicated by a broken-lined square A in FIG. 11 are performed, i.e., tilt amounts corresponding to a plurality of the tilt-amount measuring positions are measured, and contents (tilt detection data) of the memory 24 are updated (S2-9). Further, data to be newly recorded on the optical disk 1 is synchronized with data already recorded on the optical disk 1, and the recording is resumed at a recording start position by recording data continuous to data recorded immediately before the interruption of the recording (S2-10). Then, it is judged whether the optical head reaches the next tilt-amount measuring position (S2-4). Thereafter, when the recording is completed (Y in S2-6), the closing process follows the write process.

Besides, in S2-9 shown in FIG. 12, after the steps indicated by the broken-lined square A in FIG. 11 are performed, i.e., the tilt amounts are measured, and the contents (the tilt detection data) of the memory 24 are updated, a tilt correction may be performed according to the updated tilt detection data, and thereafter the recording may be resumed.

Figure 13:
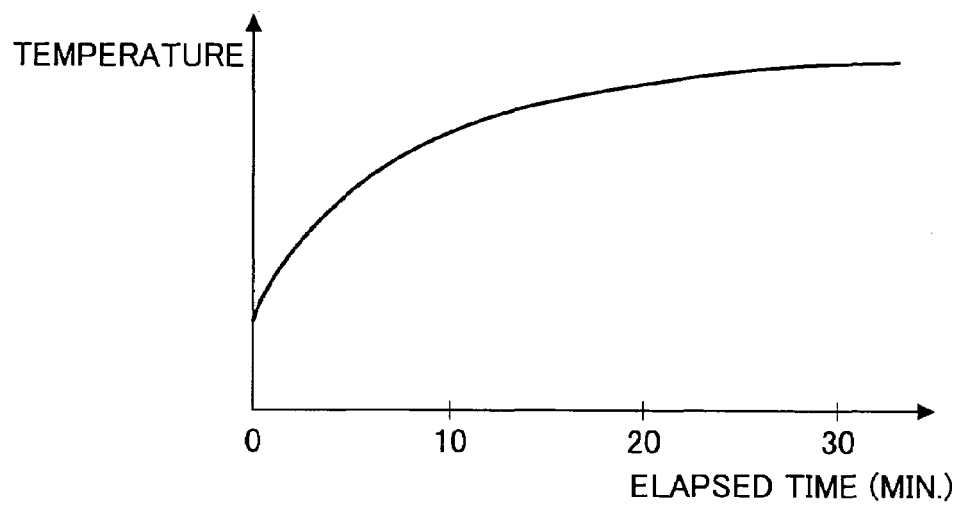
FIG. 13 is a graph showing a temperature change in an optical pickup shown in FIG. 2 when the optical pickup is started operating from a non-operative state.

FIG. 13 is a graph showing a temperature change in the optical pickup 5 when the optical pickup 5 is started operating from a non-operative state. Since the optical pickup 5 undergoes a temperature change with a time constant of approximately 10 to 30 minutes as shown in FIG. 13, a time interval for obtaining tilt detection data is set at approximately one to two minutes, in order to follow each temperature and not to interrupt a recording/reproduction frequently. However, the time interval is not limited to the above-mentioned approximately one to two minutes; the time interval may be set according to a designing discretion in consideration of an amount of change in tilt to be caused by the temperature change, and an interval to be set for interrupting the recording/reproduction.

As described above, according to the second embodiment, when a predetermined time has elapsed after obtaining tilt detection data corresponding to a plurality of tilt-amount measuring positions, a recording/reproduction is interrupted; then, tilt detection data corresponding to each of the radial positions are measured again by the above-described steps, and tilt detection data in the memory are updated; subsequently, the recording/reproduction is continued while a tilt correction is performed according to the new tilt detection data. Therefore, for example, even when optimal tilt amounts of the optical disk 1 and the optical pickup 5 change according to a temperature change, a tilt correction can be performed according to the newly obtained tilt detection data corresponding to the tilt-amount measuring positions. Thus, an appropriate tilt correction can be performed.

Figure 14:
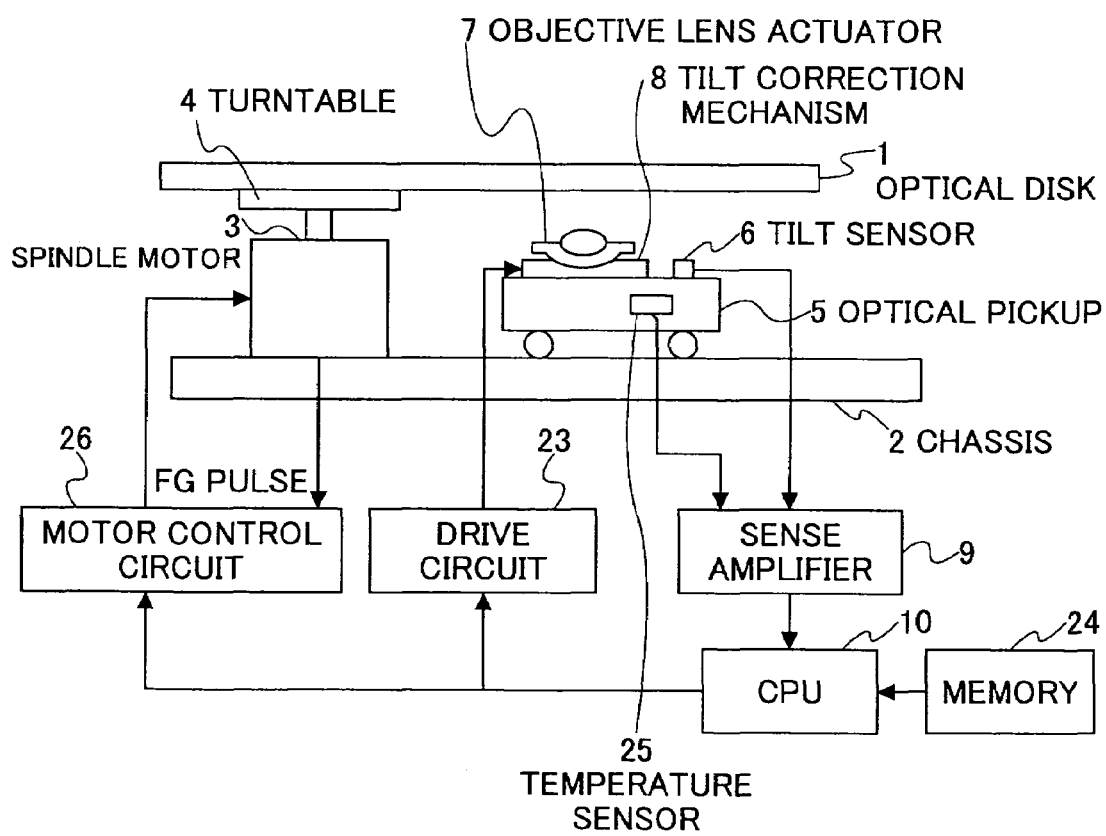
FIG. 14 is a block diagram showing a main configuration of an optical disk device according to a third embodiment of the present invention.

FIG. 14 is a block diagram showing a main configuration of an optical disk device according to a third embodiment of the present invention. As shown in FIG. 14, the configuration further involves a temperature sensor 25 (a temperature detection part), such as a thermistor. Parts in FIG. 14 that are identical or equivalent to the parts shown in FIG. 2 are referenced by the same reference marks, and will not be described in detail.

The temperature sensor 25 is mounted on the optical pickup 5. An output from the temperature sensor 25 is amplified by the sense amplifier 9, and is transmitted to the CPU 10 as a temperature signal.

Figure 15:
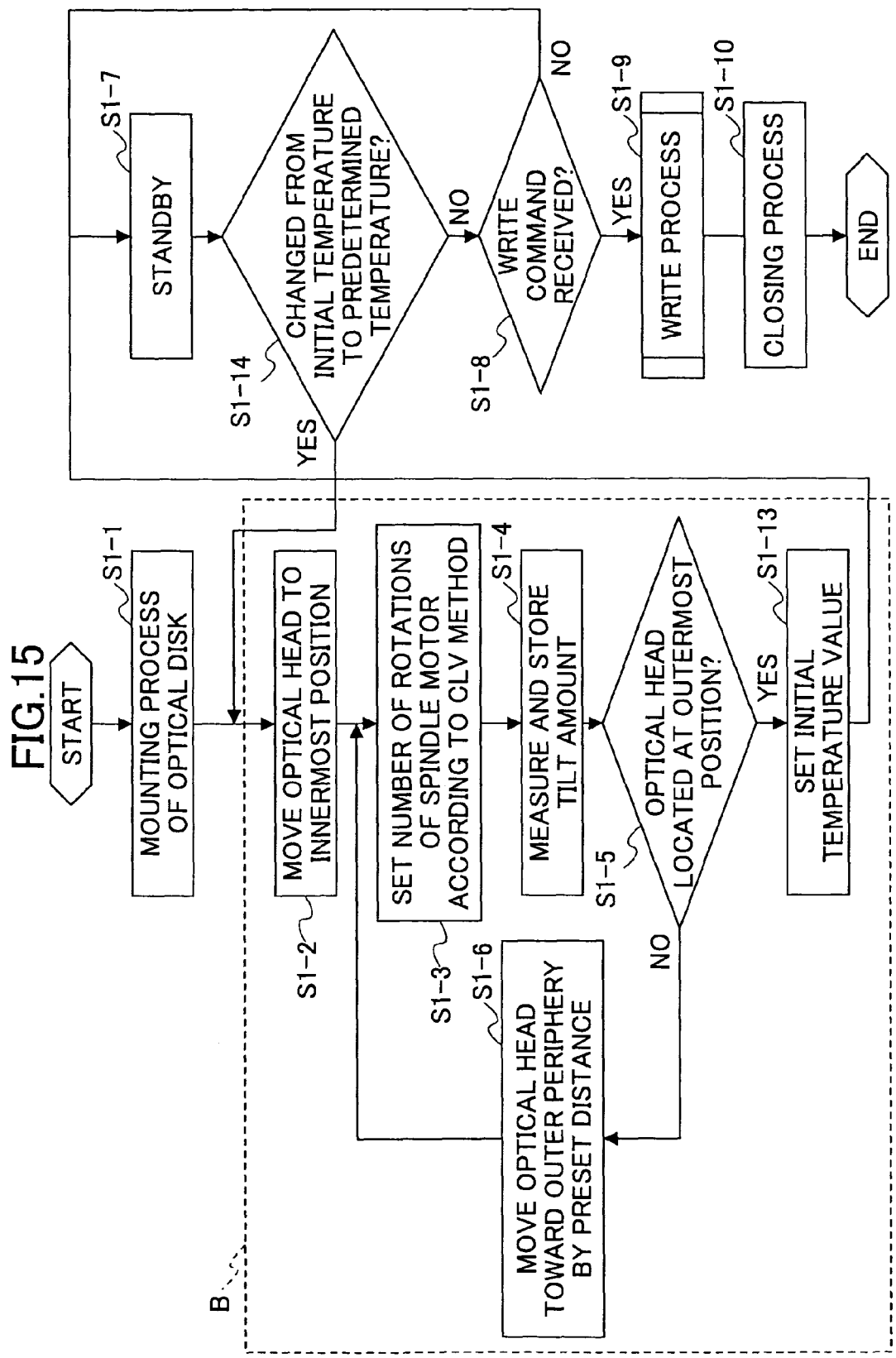
FIG. 15 is a flowchart showing a procedure of measuring tilt amounts corresponding to a plurality of tilt-amount measuring positions in the optical disk device according to the third embodiment of the present invention.

FIG. 15 is a flowchart showing a procedure of measuring tilt amounts corresponding to a plurality of tilt-amount measuring positions in the optical disk device according to the third embodiment of the present invention. Control steps in FIG. 15 that are identical to the control steps shown in FIG. 6 are referenced by the same step numbers, and will not be described in detail. Besides, when recording/reproducing information by the CAV method, the same control as in the foregoing first embodiment is performed.

As shown in FIG. 15, after the mounting process of the optical disk 1 (S1-1), the same control steps as in FIG. 6 are performed, and when it is judged that the optical head reaches the outermost position (Y in S1-5), an initial temperature value is set (S1-13); thereafter, a standby state commences (S1-7). During the standby state, a temperature of the optical pickup 5 is detected according to a detection signal from the temperature sensor 25, and it is judged therefrom whether the temperature of the optical pickup 5 changes from the initial temperature to a predetermined temperature (S1-14). When the temperature of the optical pickup 5 does not change from the initial temperature to the predetermined temperature (N in S1-14), it is judged whether the write command is received (S1-8). When the temperature of the optical pickup 5 changes from the initial temperature to the predetermined temperature (Y in S1-14), the optical head is moved to the innermost position (S1-2), and tilt amounts are again measured and stored (S1-3 to S1-6). Thus, prior to recording/reproducing information to/from the optical disk 1, tilt detection data corresponding to a plurality of the tilt-amount measuring positions is obtained as by the procedure shown in FIG. 15, and is stored in the memory 24. Concurrently, the temperature of the optical pickup 5 at that time is also stored in the memory 24 as an initial temperature (S1-13).

Figure 16:
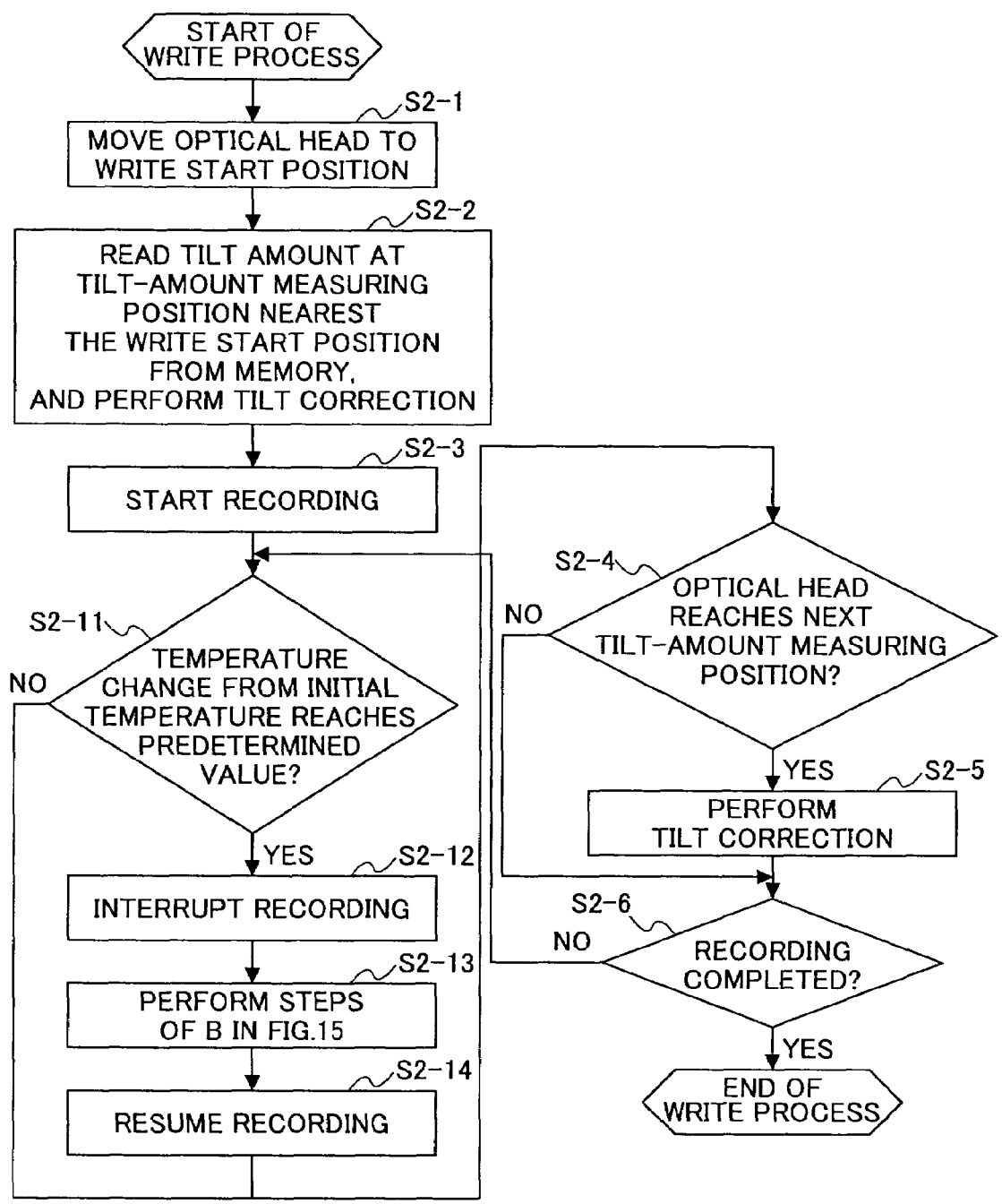
FIG. 16 is a flowchart showing an example of controlling a write process shown in FIG. 15.

FIG. 16 is a flowchart showing an example of controlling the write process shown in FIG. 15. Control steps in FIG. 16 that are identical to the control steps shown in FIG. 7 are referenced by the same step numbers, and will not be described in detail. In FIG. 16, control steps (S2-11) to (S2-14) are added between the control steps (S2-3) and (S2-4) shown in FIG. 7.

First, the optical head is moved to a write start position (S2-1). Thereafter, a tilt amount at a tilt-amount measuring position nearest the write start position is read from the memory 24, and a tilt correction is performed according to the read tilt amount (S2-2), and thereafter, a recording is started (S2-3). During the recording, a temperature detected by the temperature sensor 25 is monitored (S2-11). When a temperature change from the initial temperature has not reached a predetermined value (N in S2-11), it is judged whether the optical head reaches the next tilt-amount measuring position (S2-4). When the optical head reaches the next tilt-amount measuring position (Y in S2-4), a tilt amount corresponding to the tilt-amount measuring position is read from the memory 24, and a tilt correction is performed according to the read tilt amount (S2-5). Thereafter, the temperature detected by the temperature sensor 25 is again monitored (S2-11). When the optical head does not reach the next tilt-amount measuring position (N in S2-4), the temperature detected by the temperature sensor 25 is again monitored (S2-11). When the temperature change from the initial temperature has reached the predetermined value (Y in S2-11), the recording is interrupted (S2-12), and the steps indicated by a broken-lined square B in FIG. 15 are performed, i.e., tilt amounts corresponding to a plurality of the tilt-amount measuring positions are measured, and contents (tilt detection data) of the memory 24 are updated (S2-13). Further, data to be newly recorded on the optical disk 1 is synchronized with data already recorded on the optical disk 1, and the recording is resumed at a recording start position by recording data continuous to data recorded immediately before the interruption of the recording (S2-14). Then, it is judged whether the optical head reaches the next tilt-amount measuring position (S2-4). Thereafter, when the recording is completed (Y in S2-6), the closing process follows the write process. As described above, upon recording/reproducing, a tilt correction is performed by applying a current to the tilt coil 21 via the drive circuit 23 according to the tilt detection data corresponding to a plurality of the tilt-amount measuring positions. Besides, when the temperature detected by the temperature sensor 25 changes from the initial temperature by the predetermined value, the recording/reproducing is interrupted; then, tilt detection data at each of the tilt-amount measuring positions are measured again, and the contents (the tilt detection data) in the memory 24 are updated; subsequently, the recording/reproduction is continued while a tilt correction is performed according to the new tilt detection data.

Besides, in S2-13 shown in FIG. 16, after the steps indicated by the broken-lined square B in FIG. 15 are performed, i.e., the tilt amounts are measured, and the contents (the tilt detection data) of the memory 24 are updated, a tilt correction may be performed according to the updated tilt detection data, and thereafter the recording may be resumed.

As above, according to the third embodiment, even when a temperature change causes changes in characteristics of the optical pickup 5 and posture of the tilt sensor 6, a tilt correction can be performed according to newly obtained tilt detection data. Thus, an appropriate tilt correction can be performed. Besides, since the temperature is actually detected, recording/reproduction does not have to be interrupted when the temperature change is small causing small changes in characteristics of the optical pickup 5.

Figure 17:
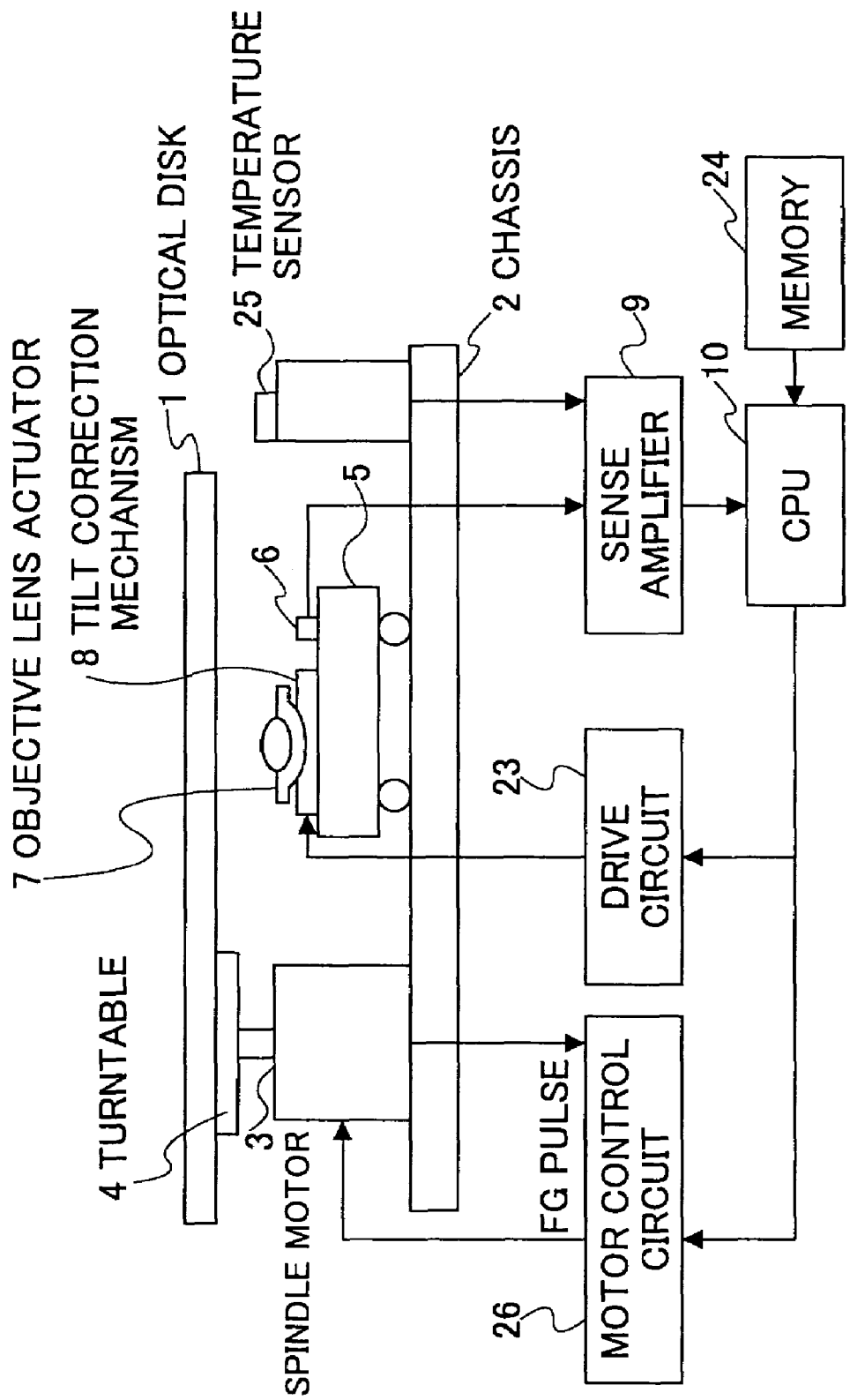
FIG. 17 is a block diagram showing another example of the configuration of the optical disk device according to the third embodiment of the present invention.

Besides, the temperature sensor 25 may be mounted on any position of the optical pickup 5 as long as the temperature sensor 25 at the position does not hinder a seek movement of the optical pickup 5. For example, the temperature sensor 25 may be mounted in the vicinity of a laser diode that is a light source for recording/reproduction. Further, the temperature sensor 25 may not only be mounted on the optical pickup 5, but also be provided in the vicinity of the optical disk 1. For example, as shown in FIG. 17, the temperature sensor 25 may be provided in the vicinity of a perimeter of the optical disk 1 in the optical disk device. Accordingly, even when the tilt of the optical disk 1 changes according to a temperature change, a tilt correction can be performed according to newly obtained tilt detection data representing a tilt for each of the radial positions. Thus, an appropriate tilt correction can be performed.

Besides, embodiments of the present invention are not limited to the heretofore-described embodiments. For example, in the foregoing embodiments, a tilt correction is performed by rotating the optical head; not limited thereto, however, the optical pickup 5 and the driving mechanism driving the optical pickup 5 may be provided on a frame member, and this frame member may be provided rotatably on the chassis 2 so that a radial tilt can be corrected. In addition, the foregoing embodiments set forth the control of a tilt correction in the write process; not limited thereto, however, a tilt correction may be performed in a read process.

Besides, the optical disk device according to the foregoing second or third embodiment may be applied to a video recording/reproducing device for recording/reproducing a TV program. In this case, during recording, tilt detection data is updated in a period from an interruption of the recording to a resumption thereof, as described above. Recording data transmitted during this period needs to be stored in the buffer RAM 30 shown in FIG. 5. Therefore, the buffer RAM 30 may have a large storage capacity; alternatively, prior to the interruption of the recording for updating tilt detection data, data stored in the buffer RAM 30 may be reduced as much as possible.

The present invention is not limited to the specifically disclosed embodiments, and variations and modifications may be made without departing from the scope of the present invention.

The present application is based on Japanese priority applications No. 2002-239008 filed on Aug. 20, 2002, and No. 2003-131496 filed on May 9, 2003, the entire contents of which are hereby incorporated by reference.

What is claimed is:

1. An optical disk device comprising:
a spindle motor rotationally driving an optical disk;
an optical pickup projecting a light on the rotating optical disk so as to record or reproduce information;
a tilt detection part detecting a relative tilt between the optical disk and said optical pickup;
an optical-pickup-position detection part detecting a position of said optical pickup in a radial direction of the optical disk;
a tilt storage part for storing tilt detection data output from said tilt detection part;
a tilt correction part correcting the tilt according to the tilt detection data stored in said tilt storage part; and
a control part performing controls for moving said optical pickup to a plurality of measuring positions set beforehand in the radial direction of the optical disk prior to recording or reproducing the information, for detecting the tilt with said spindle motor being rotated so that a linear velocity at each of said measuring positions equals a linear velocity upon actually recording or reproducing the information thereat, and for storing the tilt detection data in said tilt storage part,
wherein when a predetermined time elapses after detecting the tilt at each of said measuring positions and storing the tilt detection data in said tilt storage part, the tilt at each of said measuring positions is detected again, and the tilt detection data stored in said tilt storage part is updated.

2. The optical disk device as claimed in claim 1, wherein when the recording is being performed when a predetermined time elapses after detecting the tilt at each of said measuring positions and storing the tilt detection data in said tilt storage part, the recording is interrupted, the tilt at each of said measuring positions is detected again, and the tilt detection data stored in said tilt storage part is updated, and thereafter, recording data continuous to data recorded immediately before the recording being interrupted is synchronized with data already recorded on the optical disk, and the recording is resumed by recording said recording data seamlessly at an end of said data recorded immediately before the recording being interrupted.

3. An optical disk device comprising:
a spindle motor rotationally driving an optical disk;
an optical pickup projecting a light on the rotating optical disk so as to record or reproduce information;
a tilt detection part detecting a relative tilt between the optical disk and said optical pickup;
an optical-pickup-position detection part detecting a position of said optical pickup in a radial direction of the optical disk;
a tilt storage part for storing tilt detection data output from said tilt detection part;
a tilt correction part correcting the tilt according to the tilt detection data stored in said tilt storage part;
a control part performing controls for moving said optical pickup to a plurality of measuring positions set beforehand in the radial direction of the optical disk prior to recording or reproducing the information, for detecting the tilt with said spindle motor being rotated so that a linear velocity at each of said measuring positions equals a linear velocity upon actually recording or reproducing the information thereat, and for storing the tilt detection data in said tilt storage part; and
a temperature detection part,
wherein when an output of said temperature detection part changes by equal to or more than a predetermined value from an output of said temperature detection part output upon detecting the tilt at each of said measuring positions and storing the tilt detection data in said tilt storage part, the tilt at each of said measuring positions is detected again, and the tilt detection data stored in said tilt storage part is updated.

4. The optical disk device as claimed in claim 3, wherein said temperature detection part is provided on said optical pickup.

5. The optical disk device as claimed in claim 3, wherein said temperature detection part is provided adjacent to the optical disk.

6. The optical disk device as claimed in claim 3, wherein when the recording is being performed when an output of said temperature detection part changes by equal to or more than a predetermined value from an output of said temperature detection part output upon detecting the tilt at each of said measuring positions and storing the tilt detection data in said tilt storage part, the recording is interrupted, the tilt at each of said measuring positions is detected again, and the tilt detection data stored in said tilt storage part is updated, and thereafter, recording data continuous to data recorded immediately before the recording being interrupted is synchronized with data already recorded on the optical disk, and the recording is resumed by recording said recording data seamlessly at an end of said data recorded immediately before the recording being interrupted.

* * * * *